United States Patent
Hayaishi

(10) Patent No.: US 7,454,056 B2
(45) Date of Patent: Nov. 18, 2008

(54) COLOR CORRECTION DEVICE, COLOR CORRECTION METHOD, AND COLOR CORRECTION PROGRAM

(75) Inventor: Ikuo Hayaishi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 629 days.

(21) Appl. No.: 11/093,941

(22) Filed: Mar. 29, 2005

(65) Prior Publication Data

US 2005/0219587 A1 Oct. 6, 2005

(30) Foreign Application Priority Data

Mar. 30, 2004 (JP) ............... 2004-097537
Feb. 15, 2005 (JP) ............... 2005-037997

(51) Int. Cl.
G06K 9/00 (2006.01)
G03F 3/08 (2006.01)
H04N 9/73 (2006.01)

(52) U.S. Cl. .............. 382/167; 358/520; 348/225.1
(58) Field of Classification Search ........ 382/167; 348/223.1, 225.1; 358/515, 520
See application file for complete search history.

(56) References Cited

U.S. PATENT DOCUMENTS

| | | | |
|---|---|---|---|
| 5,384,601 A | * | 1/1995 | Yamashita et al. ....... 348/577 |
| 5,420,630 A | * | 5/1995 | Takei ........... 348/223.1 |
| 6,975,759 B2 | * | 12/2005 | Lin ............. 382/167 |
| 2003/0235333 A1 | * | 12/2003 | Lin ............. 382/167 |
| 2004/0156544 A1 | * | 8/2004 | Kajihara ........ 382/167 |
| 2004/0208363 A1 | * | 10/2004 | Berge et al. ...... 382/167 |

FOREIGN PATENT DOCUMENTS

JP 2001-320727 11/2001
JP 2002-044469 2/2002

OTHER PUBLICATIONS

Abstract of Japanese Patent Publication No. 2001-320727, Pub. Date: Nov. 16, 2001, Patent Abstracts of Japan.
Abstract of Japanese Patent Publication No. 2002-044469, Pub. Date: Feb. 8, 2002, Patent Abstracts of Japan.

* cited by examiner

Primary Examiner—Colin LaRose
(74) Attorney, Agent, or Firm—Martine Penilla & Gencarella LLP

(57) ABSTRACT

A CPU 200 acquires image data of a photographed image, determines a specific subject area containing a specific subject in the photographed image, and calculates a specific subject characteristic value for representing a characteristic of image data corresponding to the determined specific subject area. CPU200 calculates a correction value for color balance correction using the calculated specific subject characteristic value and a preset characteristic target value, and executes the color balance correction on the image data using the calculated correction value.

18 Claims, 7 Drawing Sheets

COLOR CORRECTION DEVICE, COLOR CORRECTION METHOD, AND COLOR CORRECTION PROGRAM

BACKGROUND OF THE INVENTION

1. Field of the Invention

The present invention relates to image processing, and particularly relates to art for color balance correction on image data.

2. Description of the Related Art

Image processing called color balance correction for correcting changes in color according to the type of light source during imaging, is performed on image data generated by a digital still camera or a video camera. As a typical color balance correction method, methods are known for which the basic idea is to correct each color component so that the average color of the overall image becomes colorless (white or gray).

By color balance correction, it is possible to reduce color seepage that occurs in images. For example, a subject that was originally white color can be reproduced with the correct white color regardless of the type of light source or the like during imaging.

However, aforementioned color balance correction performed on a portrait (human subject image) for which the overall background is a blue-tinged white, suppresses blue tints and emphasizes the red tints for the overall image, so the flesh color of the human subject which is the main subject becomes red-tinged, significantly distancing it from the desired color. Thus, when using such conventional correction method, there is the risk of making an undesirable change to the color tone of a specific subject.

SUMMARY OF THE INVENTION

The present invention was is intended to address the aforementioned problems, and its object is to provides image processing to execute color balance correction according to the subject and to improve the appearance of the subject in an image.

In order to solve the above-mentioned problem, a first aspect of the present invention provides an image processing device for executing color balance correction on image data of a photographed image. The image processing device of the first aspect of the present invention is characterized by comprising: an image data acquisition module that acquires the image data; a specific subject area determination module that determines a specific subject area containing a specific subject in the photographed image; a specific subject characteristic value calculation module that calculates a specific subject characteristic value for representing a characteristic of image data corresponding to the determined specific subject area; a correction value calculation module that calculate a correction value for color balance correction using the calculated specific subject characteristic value and a preset characteristic target value; and a correction execution module that execute the color balance correction on the image data using the calculated correction value.

According to the image processing device of the first aspect of the present invention, a specific subject area containing a specific subject is determined and a correction value for color balance correction is obtained using a specific subject characteristic value for representing characteristic of image data corresponding to the determined specific subject area and a predetermined characteristic target value. Therefore, it is possible to correct the color balance according to the specific subject characteristic and to improve the appearance of the subject in the image.

In the image processing device of the first aspect of the present invention, the specific subject characteristic value calculation may be executed using weighted distribution with a weight in a center area of the specific subject area larger than a weight in an area outside the center area. In this case, it is possible to correct the color balance using a specific subject characteristic value which better reflects the characteristic of the center area of the specific area, the center area tending to affect the appearance of the image. Therefore it is possible to improve the appearance of the subject in the image.

In the image processing device of the first aspect of the present invention, when a plurality of the specific subject -areas are determined, the specific subject characteristic value calculation can be executed using weighted distribution set according to a size of each specific subject area on each specific subject characteristic value of the plurality of specific subject areas. The specific subject characteristics value calculation may also be_executed by obtaining a weighted average value of the specific subject characteristic value of the plurality of specific subject areas. In this case, it is possible to correct the color balance using a specific subject characteristic value which better reflects the characteristic of a large specific subject area tending to affect the appearance of the image, making it possible to improve the appearance of the subject in the image.

In the image processing device of the first aspect of the present invention, the specific subject characteristic value may be a characteristic value relating to a hue of the specific subject. In this case, it is possible to correct the color balance according to the hue of the specific subject.

In the image processing device of the first aspect of the present invention, the specific subject characteristic value may be a specific color characteristic value for representing a characteristic of pixel data included within the specific subject area, the pixel data belonging to a specific color range. In this case, it is possible to correct the color balance with a specific color as a reference, and to improve the appearance of a subject having the specific color.

In the image processing device of the first aspect of the present invention, the specific color characteristic value may be a statistical value of pixel values of the pixel data belonging to the specific color range, wherein the characteristic target value may be a preset pixel target value, and wherein the correction value calculated by the correction value calculation module may be a correction value for eliminating or reducing a difference between the statistical value of pixel values and the pixel target value. By calculating a correction value for color balance correction for eliminating or reducing the difference between the statistical value of pixel values of the pixel data belonging to the specific color range and the pixel target value, it is possible to correct the overall color balance so that the specific color of the subject approaches a desirable color.

In the image processing device of the first aspect of the present invention, the specific subject may be a face part of a human subject, and wherein the pixel data belonging to the specific color range may be flesh colored pixel data belonging to a color range corresponding to a flesh color of the human subject. In this case, it is possible to correct the overall color balance according to the flesh color of the human subject that is the subject for an image for which the subject is the face part of a human subject.

In the image processing device of the first aspect of the present invention, the correction value calculated by the correction value calculation module is a correction value weighted according to an area ratio of the specific subject area to a whole area of the photographed image. It is more suitable that executing color balance correction according to a specific subject on an photographed image, when the photographed image having a large area ratio of the specific subject area to a whole area of the image. Therefore, in this case, it is possible to more suitably correct the overall color balance by adjusting the correction strength according to the area ratio of the specific subject area.

In the image processing device of the first aspect of the present invention, the correction execution module may execute the color balance correction using the correction value when the area ratio is greater than a reference value. When the area ratio of the specific subject area is greater than a preset reference value, the specific subject in the specific subject area is the main subject, and color balance correction according to the specific subject is considered to be more effective. Therefore, in such case, by executing color balance correction according to the specific subject, it is possible to further improve the appearance of the specific subject in the image.

In the image processing device of the first aspect of the present invention, the specific subject determination module determines the specific subject area using pixel values of pixel data included in a target area for determination, and a position of the target area in the photographed image. In this case, pixel values of pixel data included in a target area for determination, and the position of that area in the photographed image are used for the process of determining the specific subject area, so it is possible to improve the precision of determining the specific subject area.

A second aspect of the present invention provides an image processing method for executing color balance correction on image data of a photographed image The image processing method of the second aspect of the present invention comprises the steps of acquiring the image data; determining a specific subject area containing a specific subject in the photographed image; calculating a specific subject characteristic value for representing a characteristic of image data corresponding to the determined specific subject area; calculating a correction value for color balance correction using the calculated specific subject characteristic value and a preset characteristic target value; and executing the color balance correction on the image data using the calculated correction value.

According to the image processing method of the second aspect of the present invention, the similar functions and effects as the image processing device of the first aspect of the present invention can be obtained. In addition, the image processing method of the second aspect of the present invention may also be actualized in a variety of aspects in a way similar to the image processing device of the first aspect of the present invention.

The image processing device of the first aspect of the present invention and the image processing method of the second aspect of the present invention may also be actualized as a computer program for realizing the functions of such method or device and a recording medium on which the computer program is stored.

These and other objects, features, aspects, and advantages of the present invention will become more apparent from the following detailed description of the preferred embodiments with the accompanying drawings.

DESCRIPTION OF THE PREFERRED EMBODIMENTS

Following, the image processing device of the present invention is described based on the embodiments with reference to drawings.

Figure 1:
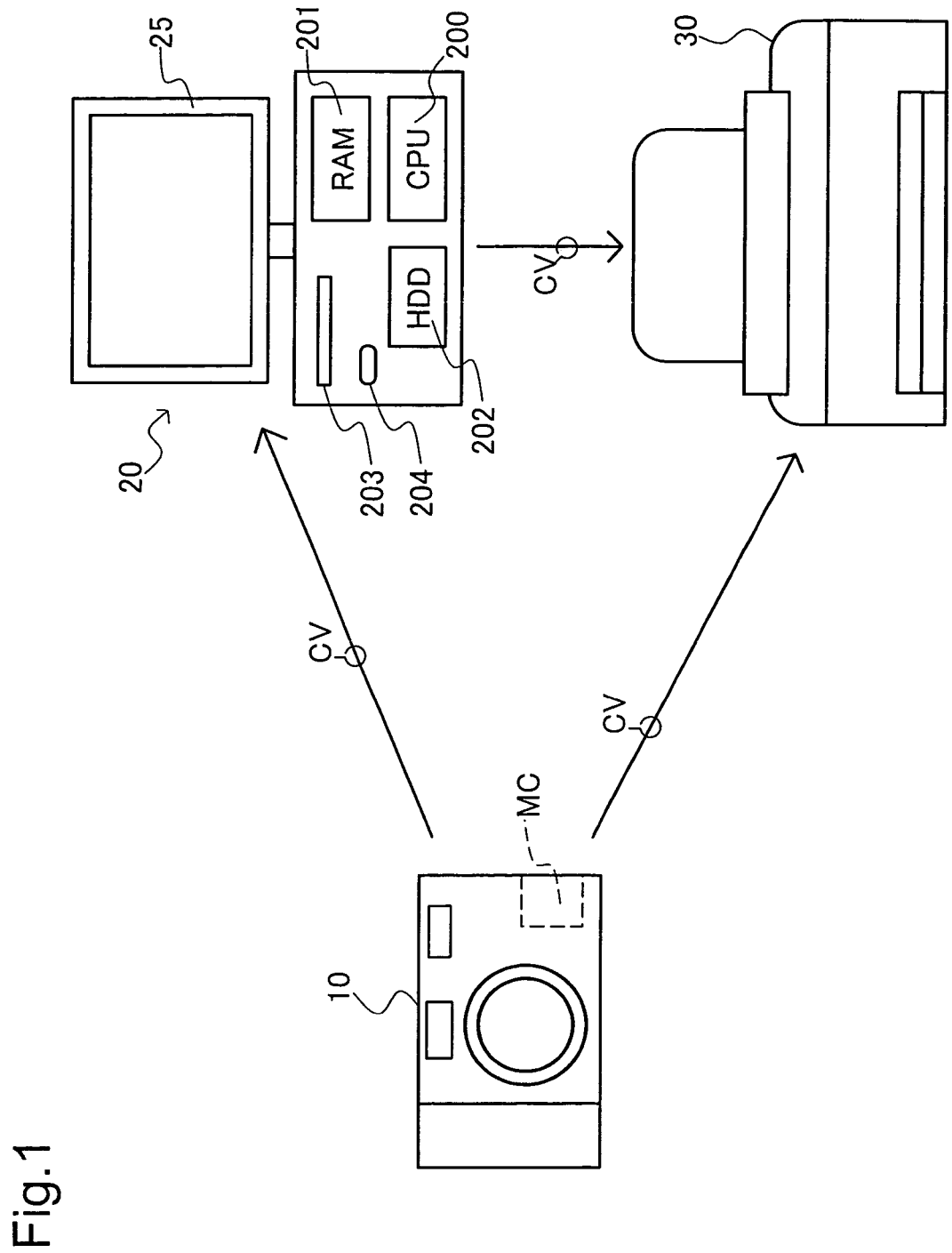
FIG. 1 is a schematic showing an image processing system including an image processing device (personal computer) of the present embodiment.

A. Arrangement of the Image Processing System FIG. 1 is a schematic showing an image processing system including an image processing device of the present embodiment. An arrangement of an image processing system, to which the image processing device of the present embodiment can be applied, will now be described with reference to FIG. 1.

The image processing system includes: a digital still camera 10 as an input device for generating image data; a personal computer 20 as an image processing device for executing image processing including color balance correction on image data generated by the digital still camera 10 and outputting image data for printing; and a color printer 30 as an output device for outputting images using image data for printing. The color printer 30 may also have an image processing function that a personal computer 20 has in order that the color printer 30 can do stand alone execution of image processing and image output. As an output device, instead of the printer 30, other devices can be used as well, for example, a monitor 25 such as LCD display, a projector, a display device that functions as an electronic photo frame. For the description below, the color printer 30 connected with the personal computer 20 is used as the output device.

The personal computer 20 is a computer in common use, and includes: a CPU 200 that executes a program for image processing including color balance correction; a RAM 201 that temporarily stores data such as image data and results of calculation made by CPU200; and a hard disk drive (HDD) 202 that stores the image processing programs. The personal computer 20 also includes: a card slot 203 for mounting a memory card MC; and an input/output terminal 204 for connecting a connection cable from the digital still camera 10 or the like.

The digital still camera 10 is a camera for acquiring images by focusing optical information a digital device (CCD or photomultiplier). The digital still camera 10 saves the acquired images as digital data in the memory card MC as a storage device. The saving format generally used for the digital still camera 10 is a JPEG which is a non-reversible compression saving format, or a TIFF which is a reversible compression saving format.

The color printer 30 is a printer capable of outputting color images, such as an inkjet type printer that forms images by forming a dot pattern by depositing four colors of inks, i.e. cyan, magenta, yellow, and black onto a printing medium. Alternatively, it is an electro photographic printer that forms images by transferring and fixing color toner on a printing medium. In addition to the four colors noted above, it is also possible to use light cyan (pale cyan), light magenta (pale magenta), red, and blue.

The following describes a case when an image data GD1 generated by the digital still camera 10 is sent to the personal computer 20, image processing on the image data GD1 is executed by the personal computer 20, and the processed image data is output to the color printer 30.

Figure 2:
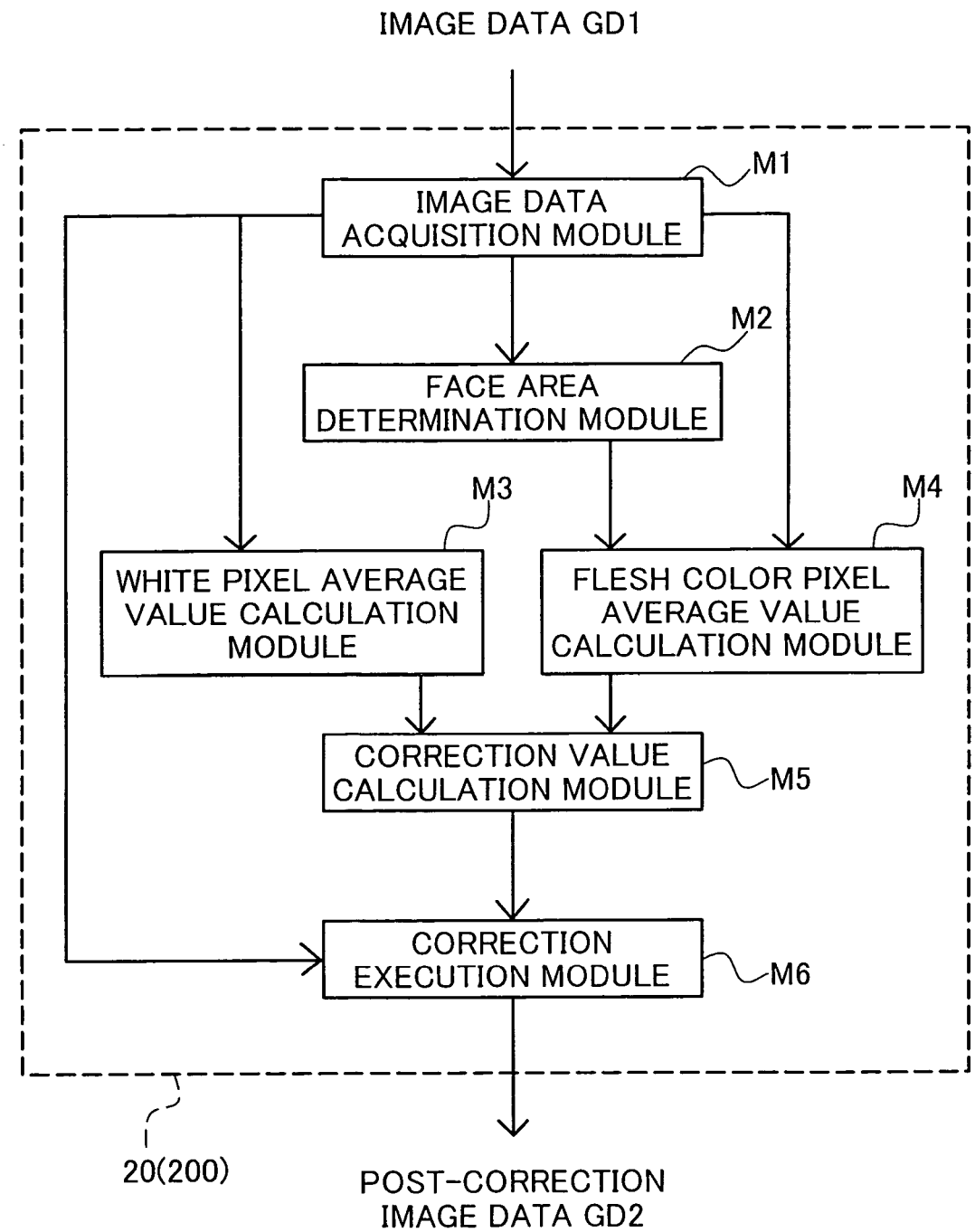
FIG. 2 is a functional block diagram of a personal computer 20 (CPU 200) of the present embodiment.

B. Functional Block of the Personal Computer 20 FIG. 2 is a functional block diagram of the personal computer 20 (CPU 200) of the present embodiment. A summary of the functional block of the personal computer 20 (CPU 200) is described with reference to FIG. 2.

An image data acquisition module M1 acquires the image data GD1 of the image, the image data GD1 being the target of processing. The image data acquisition module M1 sends the acquired image data GD1 to a face area determination module M2 and a correction execution module M6. Also, the image data acquisition module M1 sends the acquired image data GD1 to a white pixel average value calculation module M3 and a flesh color pixel average value calculation module M4 when necessary.

The face area determination module M2 analyzes the image data GD1 obtained from the image data acquisition module M1 and determines an area containing the face part of a human subject as the subject. The face area determination module M2 sends the face area determination results to the flesh color pixel average value calculation module M4.

The white pixel average value calculation module M3 analyzes the image data GD1 obtained from the image data acquisition module M1, calculates the white pixel average value, and sends the calculated white pixel average value to a correction value calculating module M5.

The flesh color pixel average value calculating module M4 acquires the image data GD1 from the image data acquisition module M1, and acquires the face area determination results from the face area determination module M2. The flesh color pixel average value calculation module M4 analyzes the image data corresponding to the determined face area, calculates the flesh color pixel average value, and sends the calculated flesh color pixel average value to the correction value calculation module M5.

The correction value calculation module M5 calculates the a correction value for color balance correction based on the white pixel average value obtained from the white pixel average value calculation module M3 and a preset white pixel target value, or, based on the flesh color pixel average value obtained from the flesh color pixel average value calculation module M4 and a preset flesh color pixel average value. The correction value calculation module M5 sends the calculated correction value for color balance correction to the correction execution module M6.

The correction execution module M6 acquires the correction value for color balance correction from the correction value calculation module M5, and acquires the image data GD1 from the image data acquisition module M1. Using the acquired correction value for color balance correction, the correction execution module M6 executes color balance correction on the overall image data GD1, and generates post-correction image data GD2.

Note that the 'specific subject area determination module' in the claims is equivalent to the 'face area determination module M2' in the present embodiment, and the 'specific subject characteristic value calculation module' in the claims is equivalent to the 'flesh color pixel average value calculation module M4' in the present embodiment.

C. Image Processing at the Personal Computer 20 The image processing executed at the personal computer 20 is described with reference to FIG. 3 through FIG. 9.

Figure 3:
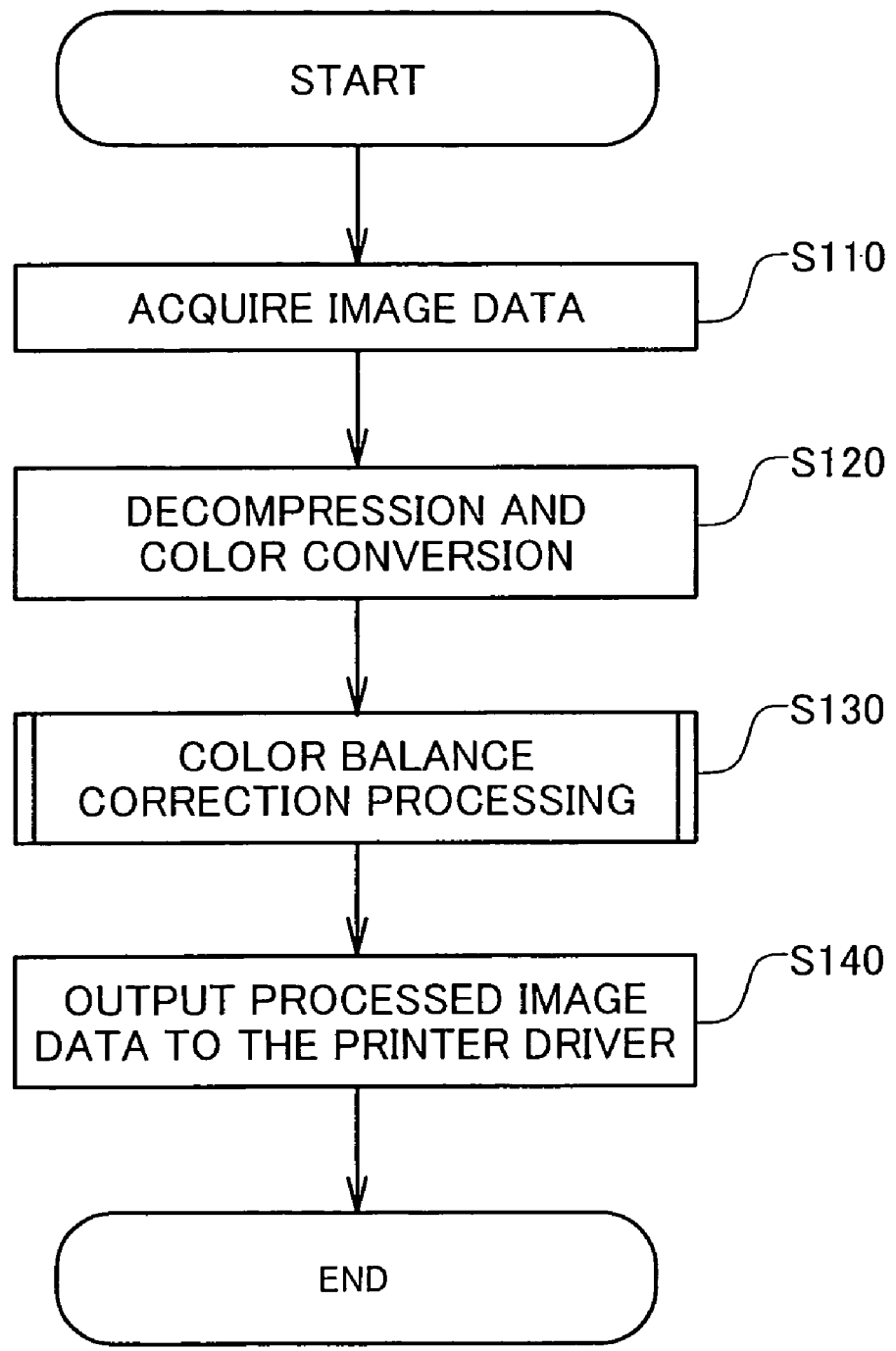
FIG. 3 is a flowchart showing the processing routine of the image processing of the present embodiment.

FIG. 3 is a flow chart showing a processing routine of an image process of the present embodiment. When the memory card MC is inserted into a slot 203, or when a connection cable CV connected to the digital still camera 10 is connected to the input/output terminal 204, the personal computer 20 (CPU 200) activates the program of this image processing. CPU200 acquires (reads) the image data GD1 of the image as the target of processing from the memory card MC according to user instructions, and temporarily stores the acquired image data in the RAM 201 (step S110).

CPU200 executes image data decompression and color conversion (step S120). The image data GD1 in the present embodiment is stored in the form of JPEG image or compressed YCbCr data. CPU200 converts this compressed data to RGB data that is typically used for image processing by a personal computer. Specifically, CPU200 decompresses the image data GD, and executes a matrix calculation using a matrix on the decompressed image data GD1 for YCbCr-RGB color conversion.

The matrix is a matrix that is typically used for the conversion from YCbCr data to RGB data in the JFIF standard, and is well-known to persons skilled in the art. A detail of the matrix is thus not described herein.

Next, CPU200 executes color balance correction processing on the converted image data GD1(step S130).

Figure 4:
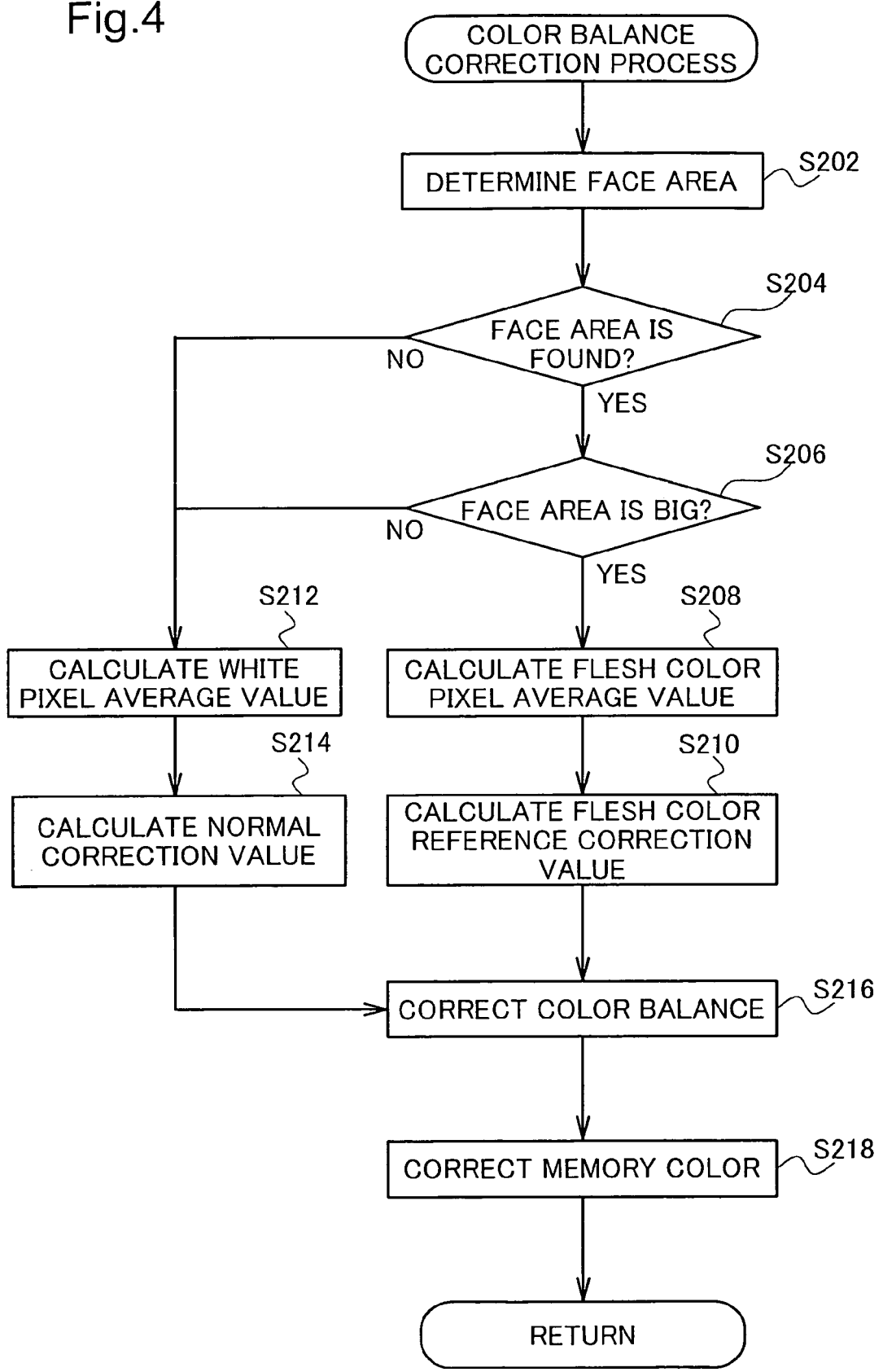
FIG. 4 is a flowchart showing the processing routine of the color balance correction of the present embodiment.

FIG. 4 is a flowchart showing the processing routine of the color balance correction of the present embodiment. When the color balance correction process starts, CPU200 first determines the specific subject area processing for determining an image area containing the specific subject on the image expressed by data GD1. In the present embodiment, the specific subject is the face part of a human subject, and CPU200 determines the face area containing the face(step S202).

In the process of the face area determination of the present embodiment, CPU 200 divides equally the image expressed by image data GD1 into vertical 16 x horizontal 16 image sections, i.e. 256 image sections. CPU200 judges for each image section whether the image section contains a face. Specifically, CPU 200 analyzes the image data corresponding to the image section which is the target of processing, and judges whether preset judging standards are met, and whether the subject within the image section is the face part of a human subject.

For example, when the proportion of flesh color pixel data to the total pixel data within the image section is greater than a specified proportion value R1, CPU 200 may also judge the image section to be an image section for which the subject is the face part of a human subject (hereafter called a "face image section"). Flesh color pixel data means pixel data belonging to a specified color range Cl corresponding to flesh color of the human subject. The specified color range Cl is set in the HSB color space, for example, by respectively deciding on a hue value H range, a saturation S range, and a brightness B range. Optimal range as the specified color range Cl and optimal value as the specified proportion value R1 are set empirically through analysis of image samples and the like.

Figure 5:
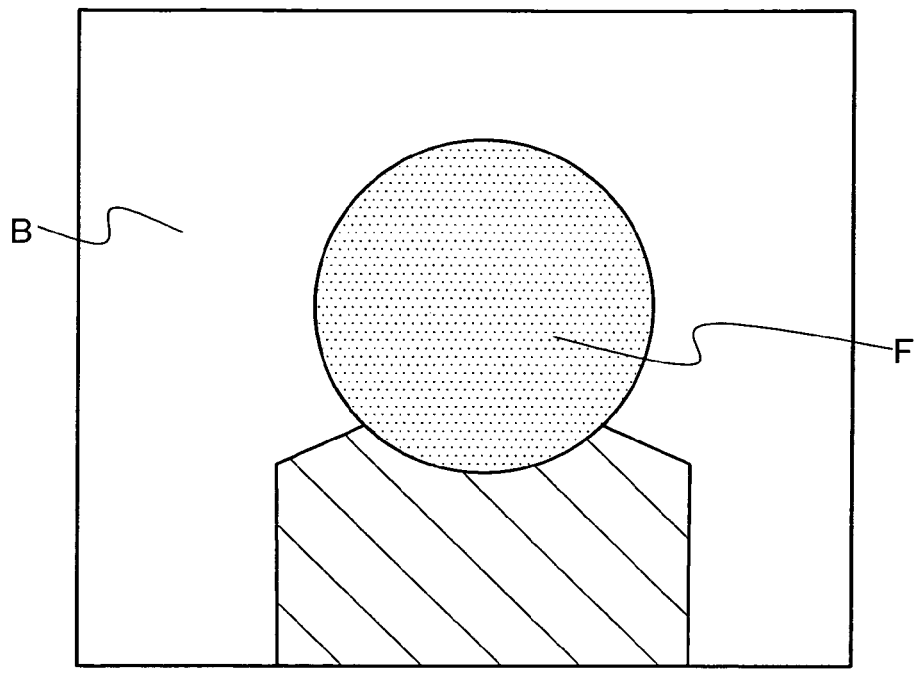
FIG. 5 is a schematic conceptually showing an example of an image expressed by image data GD1 which is target of processing.

FIG. 5 is a schematic conceptually showing an example of an image expressed by image data GD1 which is target of processing. This image is a typical portrait (human subject image) in which a relatively large human face part F occupies roughly the center portion. As a concrete example, FIG. 6 shows the results of the process of the face area determination executed on the image data GD1 shown in FIG. 5.

Figure 6:
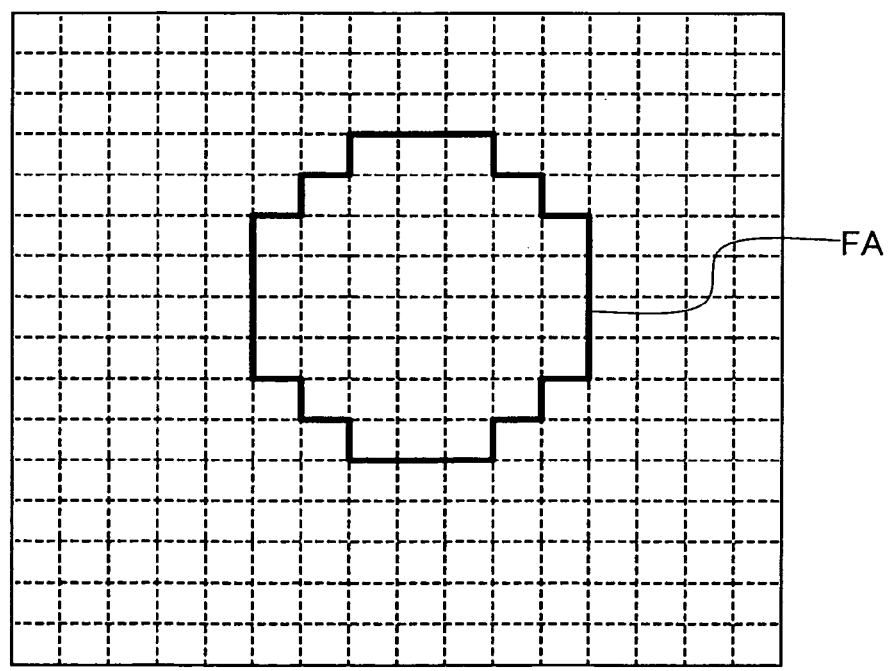
FIG. 6 is a schematic conceptually showing the results of face area determination.

FIG. 6 is a schematic conceptually showing the results of face area determination. As shown in FIG. 6, as a result of the process of the face area determination, CPU 200 determines an area as a face area FA consisting of a plurality of face image sections out of the 256 sections, the determined face area FA corresponding to a human subject face part F in an image shown in FIG. 5. In the process of face area determination, only the flesh color pixel proportion is considered, but it is also possible to set additional determination criteria for the recognized face area FA to increase the determination precision. As additional determination criteria, determination criteria using position information of the face area FA in an image may be set. Generally, in images for which a human subject was imaged as the main subject, there is a tendency to position the face part of the human subject in the center, and there are almost no cases of contacting the face part as the main subject with the left or right sides (in other words, a situation in which the face part is cut off at the image edge). Therefore, for example when the face area FA does not contact the left edge or the right edge of the image, CPU 200 may finally determine the face area FA to be the face area.

CPU 200 determines whether or not there is a face area FA in the photographed image as the target of processing (step S204). As a result of face area determination processing, when the face area FA is recognized, CPU200 determines that there is the face area FA (step S204: Yes), and then determines whether or not the proportion of the overall image occupied by the face area FA is greater than the reference (step S206). When the number of face image areas that the face area FA includes is greater than a specified reference number, for example, CPU200 determines that the proportion occupied by the face area FA is greater than the reference. In specific terms, of the image areas evenly divided into vertical 16 by horizontal 16 [sections], when the image areas determined to be face image areas are 16 or greater, it is also possible to determine that the proportion occupied by the face area FA is greater than the reference.

When there are no face areas FA, or when an area ratio of the face area FA to a whole area of the image is less than the reference, CPU200 decides to execute normal color balance correction (hereafter also called "normal correction") on the image data GD1 (step S206: No).

When the area ratio of the face area FA is greater than the reference, CPU200 decides to execute color balance correction with the flesh color in the face area FA as a reference (hereafter also called "flesh color reference correction") on the image data GD1 (step S206: Yes). The reason that an area ratio of the face area FA being greater than the reference is used as a condition for executing flesh color reference correction is that when an area ratio of the face area to a whole area is small, there is a high possibility that the human subject is not the main subject. Here, the main subject means that among the subjects existing in a photographed image, a subject that characterized the photographed image, for example, the person in a portrait. For the images in which a human subject is not the main subject, it is not effective to execute flesh color reference correction. Also, in fact, there is the risk that the color balance of a main subject that is not a human subject (e.g. scenery) will be destroyed. Therefore, for images in which a human subject is not the main subject, it is appropriate to execute normal correction.

When executing flesh color reference correction, of the image data GD1, CPU200 analyzes the image data corresponding to the face area FA, and calculates the flesh color pixel average value (step S208). The flesh color pixel average value is a weighted average value of the pixel value of the flesh color pixel data contained in the face area FA. In specific terms, CPU200 acquires the pixel values of the flesh color pixel data among the image data corresponding to the face area FA by sampling or on a pixel-by-pixel basis. CPU200 multiplies a weighting factor W on the acquired pixel values of the flesh color pixel data, and calculates a weighted pixel value. And using the calculated weighted pixel value, CPU200 calculates a flesh color pixel average saturation F (S)_ave and a flesh color pixel average hue F (H)_ave in the HSB color space.

Figure 7:
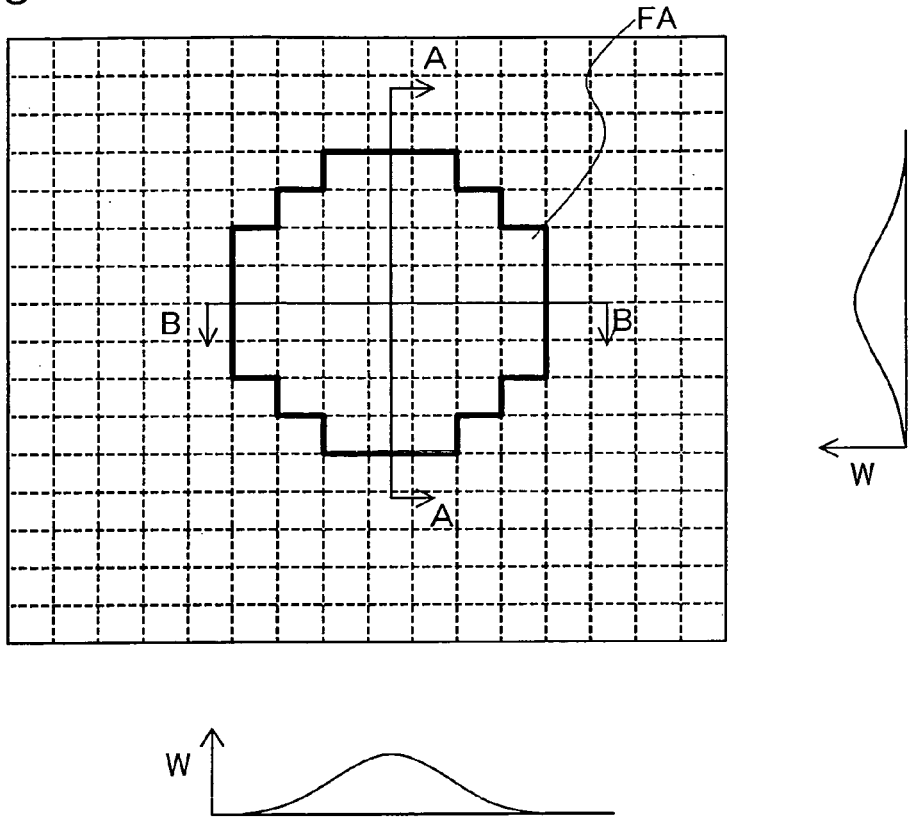
FIG. 7 is the first schematic describing the distribution of a weighting factor W used for calculating a flesh color pixel average value.

FIG. 7 is a first schematic describing the distribution of a weighting factor W used for calculating a flesh color pixel average value. The weighting factor W is determined according to the position of the flesh color pixel data in the face area FA. The distribution of the weighting factor W on the straight line A-A in the face area FA (Y direction weighted distribution), and the distribution of the weighting factor W on the straight line B-B (X direction weighted distribution) are shown in FIG. 7. As shown in FIG. 7, the weight becomes larger as the weighting factor W approaches an area at the center of the face area FA (hereafter called the "center area"), and the weight is set to be smaller in an area outside the center areas.

Figure 8:
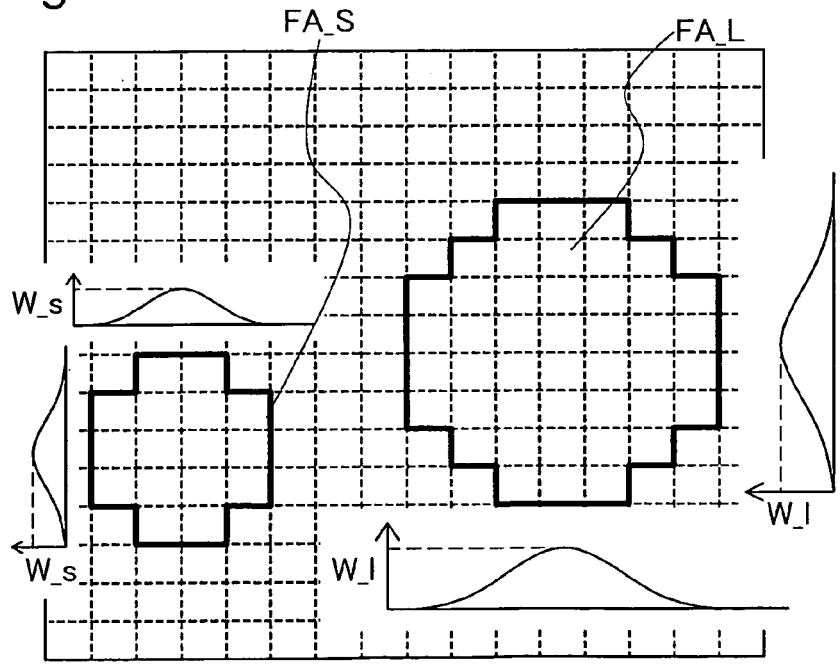
FIG. 8 is the second schematic describing the distribution of a weighting factor W used for calculating a flesh color pixel average value.

FIG. 8 is the second schematic describing the distribution of a weighting factor W used for calculating a flesh color pixel average value. Using FIG. 8, the distribution of the weighting factor W is described when there are determined to be a plurality of face areas in the image data which is the target of processing. With the example shown in FIG. 8, there are determined to be two face areas, a face area FA_L, and a face area FA_S that is smaller than the face area FA_L. The same as the case of the face area FA explained using FIG. 7, for each of face areas FA_L and FA_S, the weighting factor W has greater weight the more it is in the center area, and the weight is set to be smaller in other areas. Then, the maximum value of the weighting factor W of each face area is set to a different value according to the size of each face area. Specifically, as shown in FIG. 8, the maximum value W_s of the weighting factor W of the face area FA_S that is smaller than the face area FA_L is set to be smaller than the maximum value W_1 of the weighting factor W of the face area FA_L. For example, it is also possible to set the maximum value of the weighting factor W to be proportional to the square measure of the face area.

Using the calculated flesh color pixel average saturation F (S)_ave, the flesh color pixel average hue F (H)_ave, and the preset flesh color pixel target value, CPU200 calculates the correction value for color balance correction (hereafter called "flesh color reference correction value") (step S210).

CPU200 converts the flesh color pixel average color in the HSB color space to an RGB color space, and calculates the flesh color pixel average color in the RGB color space. Here, the flesh color pixel average color for the HSB color space is a color defined by the calculated flesh color pixel average saturation F (S)_ave, the calculated flesh color pixel average hue F (H)_ave, and a preset correction reference brightness F (B)_ref. Then, the respective RGB color component values for representing the flesh color pixel average color in the RGB color space are F2(R)_ave, F2(G)_ave, and F2(B)_ave. In the present embodiment, a brightness value represented by 8-bit data and scope of a brightness value is from 0 to 255. Then, a preset correction reference brightness F (B)_ref is set to 192, for example.

The flesh color pixel target value is a pixel value that defines the flesh color pixel target color for the correction reference brightness F (B)_ref The flesh color pixel target color is a color obtained empirically by sample analysis, for example; and is a flesh color that is desirable as the flesh color of the human subject. In the present embodiment, the flesh color pixel target color is defined in the HSB color space by three flesh color pixel target values (flesh color pixel target hue F (H)_target, flesh color pixel target saturation F (S)_target, and correction reference brightness F (B)_ref). The respective RGB color component values for representing the flesh color pixel target color converted from in the HSB color space to in the RGB space are F2(R)_target, F2(G)_target, and F2(B)_target.

CPU200 calculates the flesh color reference correction values for each respective RGB color component, the values being correction value ΔC (R)_face, ΔC (G)_face, and ΔC (B)_face. CPU200 calculates each correction value using the various numerical values described above according to the following formulas (1a) to (1c).

$$\Delta C(R)\_face = F2(R)\_target - F2(R)\_ave \quad (1a)$$

$$\Delta C(G)\_face = F2(G)\_target - F2(G)\_ave \quad (1b)$$

$$\Delta C(B)\_face = F2(B)\_target - F2(B)\_ave \quad (1c)$$

The right sides of the formulas (1a) to (1c) are the difference between the pixel value for representing the average color of the flesh color pixel within the face area FA in the RGB color space, and the pixel value for representing the flesh color pixel target color which is a desirable flesh color in the RGB space. When the flesh color within the face area FA is skewed from the desirable flesh color, The right sides of the formulas (1a) to (1c) have an effect of correcting the color balance of the overall image in a direction for which the flesh color within the face area FA approaches the desirable flesh color.

Described next is a case that executes normal color balance correction (normal correction) (step S204: No, or step S206: No). For normal correction, it is possible to use various methods that are publicly known as color balance correction methods. For example, the method in which the average value of the image data close to white color approaches colorless (correct white) can be used. Following is a brief description of such method.

When executing normal correction, CPU200 analyzes the overall image data GD1, and calculates the white pixel average value (step S212). A white pixel means a pixel which has pixel values belonging to a law saturation and high brightness specified color range (color range close to white) in the HSB color space. The white pixel average value is an average value relating to pixel data of white pixels. As the white pixel average value, CPU200 calculates the average value of each color component in the RGB color space W (R)_ave, W (G)_ave, and W (B)_ave, and the average value of brightness in the HSB color space W (H)_ave.

Using the calculated white pixel average values, CPU200 calculates the normal correction values for each color component in the RGB color space, i.e. ΔC (R)_white, ΔC (G)_white, and ΔC (B)_white, according to the following formulas (2a) through (2c) (step S214).

$$\Delta C(R)\_white = W(H)\_ave - W(R)\_ave \quad (2a)$$

$$\Delta C(G)\_white = W(H)\_ave - W(G)\_ave \quad (2b)$$

$$\Delta C(B)\_white = W(H)\_ave - W(B)\_ave \quad (2c)$$

The right sides of formulas (2a) through (2a) through (2c) have an effect of correcting the overall image color balance in a direction for which the white pixel color approaches a colorless color (correct white) when the white pixel color is skewed from the colorless color.

When the correction value for color balance correction (flesh color reference correction value or normal correction value) is calculated, CPU200 uses each of the calculated correction values ΔC (R), (G), and (B) to execute color balance correction, and generates post-correction image data GD2 (step S216).

Figure 9:
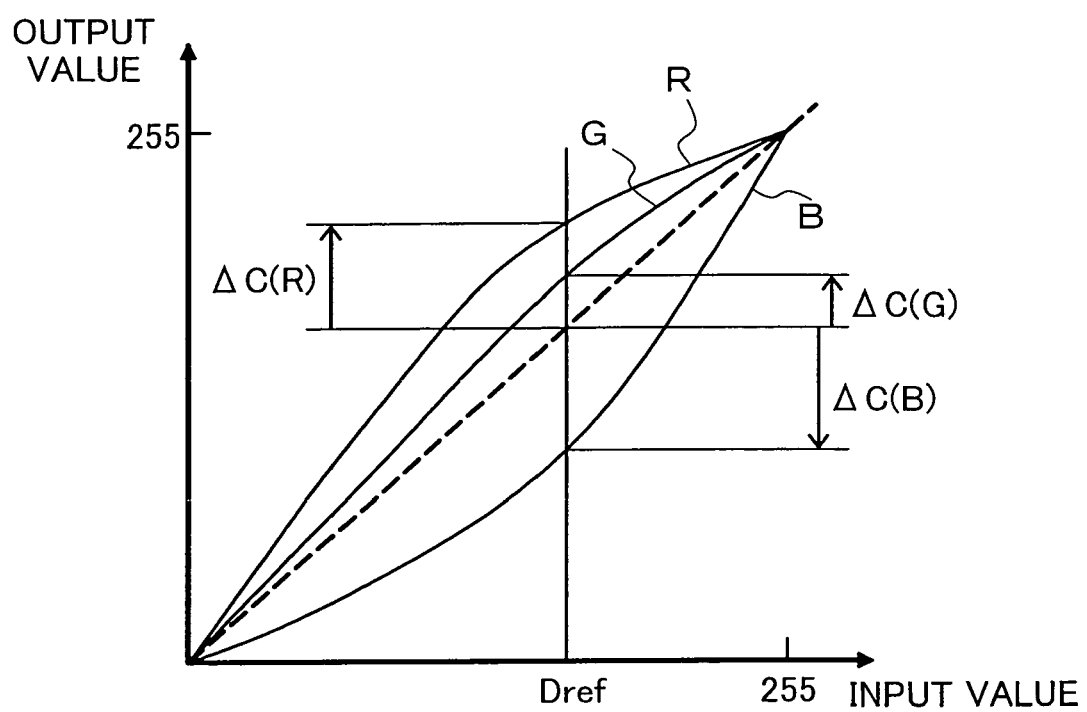
FIG. 9 is a graph showing the contents of the color balance correction of the present embodiment.

FIG. 9 is a graph showing the contents of the color balance correction executed using each correction value ΔC (R), (G), and (B). CPU200 executes gradation correction on all the pixel data of the image data GD1 using a tone curve on each color component RGB. In FIG. 9, the dotted line shows the unconverted characteristics. Each correction value ΔC (R), (G), and (B) calculated with the procedure described above correlates to the shift volume of an output value corresponding to an input reference value Dref from the unconverted characteristic.

As the input reference value Dref, it is possible to use a specified fixed value, for example. In the present embodiment, the value of the correction reference brightness F (B)_ref (192) is used as the input reference value Dref for each RGB component value that can obtain values 0 to 255 represented by 8-bit information. The tone curve is obtained by obtaining the primary characteristics line that shifts Dref as the input value to Dref +ΔC as the output value, for example.

CPU200 then executes memory color correction on post-correction image data GD2 (step S218). The memory color can be called the color that is generally remembered as an image by most people. For example, specific subject colors such as "human flesh color," "sky color," "sunset color," and "green plant color" are set in advance. In specific terms, as the memory color of "human flesh color" (hereafter called "flesh color memory color"), a specified saturation S, hue H, and brightness B are memorized in a program. Memory color correction is executed on an specified pixel data only, the specified pixel data corresponding to specific subjects (such as human skin) for which a memory color (e.g. flesh color memory color described above) is set. On the other hand, color balance correction is executed on all pixel data in image data. That's the difference between memory color correction and color balance correction. Memory color correction corrects the specified pixel data in a direction for which a specific subject color of the image as the target of processing approaches the memory color.

To describe a specific example of memory color correction for "human flesh color," CPU200 executes the same process as step S208 (see FIG. 4) for the color balance correction on post-correction image data GD2. As the result, the flesh color pixel average value for post-correction image data GD2 is calculated. Furthermore, CPU200 uses the calculated flesh color pixel average value and the flesh color memory color value described above to calculate a correction value for memory color correction for each component RGB. CPU200 uses the calculated correction value to stipulate the tone curve for each RGB component, and finally performs input-output conversion for each RGB component of flesh color data of the image data GD2 using each stipulated tone curve.

Here, the flesh color pixel target color for the color balance correction (step S216) and the flesh color memory color as a reference for memory color correction (step S218) are different colors. The flesh color pixel target color can be called the average color of the flesh color perceived via the color adaptation (the work of trying to perceive the color of an object with the effect of the light source eliminated) performed unconsciously when a person actually views a human subject. On the other hand, as described above, the flesh color memory color can be called the ideal flesh color that many people typically remember as an image. The flesh color memory color is set to have a better appearance than the color of the actually perceived flesh, and for example is set to a healthy flesh color that has more of a pink tinge.

The processing on human subject images using the image processing of this present embodiment can be said to adjust the overall image color tone so as to reproduce the flesh color of an actually perceived object (color after color adaptation) when a person images a subject (human subject) by doing color balance correction (step S216), and to perform color correction only on the flesh parts of a subject (human subject) so that the image has a better appearance by doing memory color correction(step S218). Doing the processing divided into two levels in this way is because when color tone adjustment of the overall image is done in combination with the flesh color memory color, there is the risk that an undesirable effect on the overall image will occur, such as the overall image being tinged with pink color.

CPU200 then outputs the post-correction image data GD2 to the printer driver (step S150) and ends this processing routine. At the printer driver, color conversion processing is executed for converting the post-correction image GD2 to CMYK data. Specifically, the color system of the image data is converted to a CMYK color system which is the color system used when the color printer 30 executed print processing. In specific terms, the color conversion processing is executed using a lookup table stored in the HDD 202 (or ROM) which correlates the RGB color system to the CMYK color system. Also, half tone processing and resolution conversion processing are executed, and post-processing data is output as raster data for printing to the color printer 30.

As described above, according to the present embodiment, face area FA containing the face of a human subject is determined in image data for representing an image with a human subject as the subject (e.g. a portrait), the image data corresponding to the determined face area FA is analyzed, and the flesh color pixel average value for the pixel value of the face area FA is calculated. Then, color balance correction is executed using the calculated flesh color pixel average value and the preset flesh color pixel target value. Therefore, it is possible to do color balance correction according to the flesh color that the human subject has, and to avoid giving an undesirable change in the flesh color of the human subject which is the main subject.

Furthermore, according to the present embodiment, the correction value for color balance correction that would eliminate or reduce the difference between the flesh color pixel average value and the flesh color pixel target value is calculated, and color balance correction is executed using the calculated correction value. Therefore, it is possible to correct the overall color balance in a direction for which the flesh color of the human subject in the image goes toward a desirable color.

Also, according to the present embodiment, calculation is done using a weighted distribution set so that the flesh color pixel average value is weighted heavily in the center area of the face area FA, and weighted lightly in areas other than the center area. As a result, a flesh color pixel average value is calculated that better reflects the flesh color of the center area of the face area. That allows the device to correct the color balance in a direction that further improves the appearance of the portrait, since the center area tends to affect the appearance of the portrait. The center area in the face part of the human subject, for example, forehead or nose area, tends to affect the appearance, so correcting the center area to a desirable flesh color is desired. Meanwhile, face areas other than the center area, for example the marginal area in the face, tends to become a shadow and become darker. Reflecting the flesh color of the such marginal area when correcting the color balance, there may be cases when the flesh color near the center of the face part cannot come sufficiently close to the desirable flesh color. However, according to the present embodiment, it is possible to correct the color balance appropriately to reflect the flesh color of the face center part.

Furthermore, according to the present embodiment, when a plurality of face areas are determined in the image data, the flesh color pixel average value is calculated for each of the determined plurality of face areas using weighted distribution set according to the size of the face area. As a result, for human subject images including a plurality of human subject face parts, a flesh color pixel average value that better reflects the flesh color of a large face part which tends to affect the appearance is calculated, so it is possible to do color balance correction in a direction that will further improve the appearance of the human subject image.

Also, according to the present embodiment, when the area ratio of the face area FA to the whole area of the image is greater than a specified reference value, flesh color reference correction is executed. Therefore, it is possible to suitably execute flesh color reference correction only on images for which flesh color reference correction effect is large, for which the human subject occupies an area greater than a specified proportion in the image.

Other Embodiments:

Instead of the calculation formulas of the embodiment described above, it is possible to use various formulas for calculating the correction value for color balance correction based on the specific subject characteristic value and the characteristic target value. For example, as the specific subject characteristic value, the flesh color pixel average value is used in the embodiment described above, but instead of the average value, it is also possible to use an another statistical value, for example, intermediate value.

Also, instead of the formulas (1a) to (1c), it is possible to use the following formulas multiplied each of the formulas (1a) to (1c) with the coefficient k.

$$\Delta C(R)\_face = k \times \{F2(R)\_target - F2(R)\_ave\} \quad (3a)$$

$$\Delta C(G)\_face = k \times \{F2(G)\_target - F2(G)\_ave\} \quad (3b)$$

$$\Delta C(B)\_face = k \times \{F2(B)\_target - F2(B)\_ave\} \quad (3c)$$

In this case, it is possible to adjust the color balance correction level with the value of the coefficient k.

The value of the coefficient k may be determined according to the area ratio of the face area FA to a whole area of the image. For example, the value of the coefficient k may be set in a range from 0 to 1 in proportion to area ratio of the face area FA to a whole area of the image. In this case, for an image for which the face area FA is large and the effect of the flesh color reference correction is large, it is possible to correct the flesh color of the image in a direction that comes significantly close to the desirable flesh color, and to improve the appearance of the image. Meanwhile, for an image for which the face area FA is small and there isn't much effect of the flesh color reference correction, by reducing the volume that the flesh color of the image approaches the desirable flesh color, it is possible for the flesh color reference correction to avoid giving undesirable changes to areas other than the face area FA.

Furthermore, in the embodiment noted above, according to whether or not the area ratio of the face area FA to a whole area of the image is greater than a specified reference value, a determination is made of whether to use the flesh color reference correction value $\Delta C\_face$ or to use normal correction value $\Delta C\_white$ (FIG. 4: step S206). Instead of this, it is also possible to use coefficients k1 and k2 determined according to the area ratio of the face area FA to a whole area. The coefficients k1 and k2 give a weighting for the flesh color reference correction value $\Delta C\_face$ and the normal correction value $\Delta C\_white$. For example, it is possible to execute color balance correction using the correction value for color balance correction $\Delta C$ obtained by the following formulas (4a) to (4c).

$$\Delta C(R) = k1 \times \Delta C(R)\_face + k2 \times \Delta C(R)\_white \quad (4a)$$

$$\Delta C(G) = k133 \Delta C(G)\_face + k2 \times \Delta C(G)\_white \quad (4b)$$

$$\Delta C(B) = k1 \times \Delta C(B)\_face + k2 \times \Delta C(B)\_white \quad (4c)$$

The coefficients k1 and k2 are each set in a range from 0 to 1. The coefficient k1 is set larger the greater the area ratio of the face area FA, and is set smaller the smaller it is. Conversely, the coefficient k2 is set smaller the greater the area ratio of the face area FA, and is set larger the smaller it is.

In this case, the proportion of the element of the flesh color reference correction value and the proportion of the element of the normal correction value that occupies the correction value for color balance correction $\Delta C$ (R) is adjusted according to the area ratio of the face area FA to a whole area of the image, so appropriate color balance correction is performed for the image. Specifically, for images in which the area ratio of the face area FA is large, color balance correction is executed with a focus on making the flesh color of the face area FA to the desirable flesh color, and meanwhile, for images in which the area ratio of the face area FA is small, color balance correction is executed with a focus on the color tone of the area other than the face area FA.

Also, the right side of formulas (1a) to (1c) had formulas only of difference values (e.g. F2(R)_target−F2(R)_ave), but other formulas may also be used. In this case, It is preferable to use formulas to calculate a correction value for color balance correction which eliminates or decrease the difference between the statistical value of the pixel value of the flesh color pixel data (e.g. the average value in the embodiment) and the flesh color pixel target value. For example, it is possible to use the formulas that include a squared value or square root of the difference value.

In the embodiment noted above, specific subject determination processing was performed with the face part of a human subject as the specific subject, and color balance processing was executed with the flesh color pixel data pixel average value as the specific subject characteristics, but it is also possible to execute the similar color balance correction with another item as the specific subject. In this case, CPU200 is able to execute suitable color balance correction on the image data having a specific subject other than a human face according to the specific subject characteristic. For example, CPU200 uses trees (a forest or the like) as the specific subject, and determines a tree area in the image. Then, CPU200 analyzes the image data corresponding to a tree area recognized as a result of determination, and may obtain the pixel average value of the pixel data belonging to the color area corresponding to the green of the trees as the specific subject characteristic value.

In the embodiment noted above, face area determination processing was executed using 256 image sections (vertical 16×horizontal 16 sections) into which divided the image equally, but other determination method can be used. For example, when image generation history information associated with the image data is included in a file including the image data GD1, CPU200 acquires the image generation history information and may suitably use such information for the face area determination processing. The image generation history information means information recorded in an Exif data area when the image data is saved in an Exif file format, for example. In specific terms, The image generation history information may include subject position information relating to the position of the main subject in the image, or photographed scene information such as a "human subject," "scenery," or "night scene."

In addition to the image processing of the working examples noted above, it is also possible to execute other types of image adjustment processing. For example, after further executing typical image adjustment processing such as contrast, saturation, or sharpness correction on the image data GD2, it is also possible to output the already image data to the printer driver.

Although image processing of the present invention have been described above in terms of embodiments, these embodiments of the invention are only purposed to facilitate understanding of the present invention and are not considered to limit the present invention. There may be various changes, modifications, and equivalents without departing from the spirit or scope of the claims of the present invention.

The Japanese patent applications as the basis of the priority claim of this application are incorporated in the disclosure hereof by reference:

(1) Japanese Patent Application No. 2004-97537 (filing date: Mar. 30, 2004).

(2) Japanese Patent Application No. 2005-37997 (filing date: Feb. 15, 2005).

What is claimed is:

1. An image processing device for executing color balance correction on image data of a photographed image, said image processing device comprising:

an image data acquisition module that acquires said image data;

a specific subject area determination module that determines a specific subject area in said photographed image, wherein said specific subject area contains a specific subject in said photographed image;

a specific subject characteristic value calculation module that calculates a specific subject characteristic value, wherein said specific subject characteristic value represents a characteristic of image data corresponding to said determined specific subject area, wherein said specific subject characteristic value calculation is executed using weighted distribution, and wherein said weighted distribution is set so as to be a weight in a center area of said specific subject area larger than a weight in an area outside said center area;

a correction value calculation module that calculates a correction value for color balance correction using said calculated specific subject characteristic value and a preset characteristic target value; and a correction execution module that executes said color balance correction on said image data using said calculated correction value.

2. An image processing device according to claim 1 wherein
said specific subject characteristic value calculation is executed by obtaining a weighted average value of each specific subject characteristic value of a plurality of specific subject areas.

3. An image processing device according to claim 1, wherein
said specific subject characteristic value includes a characteristic value relating to a hue of said specific subject.

4. An image processing device according to claim 1, wherein
said specific subject characteristic value includes a specific color characteristic value for representing a characteristic of pixel data included within said specific subject area, said pixel data belonging to a specific color range.

5. An image processing device according to claim 4, wherein
said specific color characteristic value includes a statistical value of pixel values of said pixel data belonging to said specific color range,
wherein said characteristic target value includes a preset pixel target value, and
wherein said calculated correction value includes a correction value for eliminating or reducing a difference between said statistical value of pixel values and said pixel target value.

6. An image processing device according to claim 4, wherein
said specific subject includes a face part of a human subject, and
wherein said pixel data belonging to said specific color range includes flesh colored pixel data belonging to a color range corresponding to a flesh color of said human subject.

7. An image processing device according to claim 1, wherein
said correction execution module executes said color balance correction using said calculated correction value when an area ratio of said specific subject area to a whole area of said photographed image is greater than a reference value.

8. An image processing device for executing color balance correction on image data of a photographed image, said image processing device comprising:
an image data acquisition module that acquires said image data;
a specific subject area determination module that determines a specific subject area in said photographed image, wherein said specific subject area contains a specific subject in said photographed image;
a specific subject characteristic value calculation module that calculates a specific subject characteristic value, wherein said specific subject characteristic value represents a characteristic of image data corresponding to said determined specific subject area;
a correction value calculation module that calculates a correction value for color balance correction using said calculated specific subject characteristic value and a preset characteristic target value; and
a correction execution module that executes said color balance correction on said image data using said calculated correction value, wherein
when a plurality of said specific subject areas are determined,
said specific subject characteristic value calculation is executed using weighted distribution, wherein said weighted distribution is set according to a size of each specific subject area on each specific subject characteristic value of said plurality of specific subject areas.

9. An image processing device for executing color balance correction on image data of a photographed image, said image processing device comprising:
an image data acquisition module that acquires said image data;
a specific subject area determination module that determines a specific subject area in said photographed image, wherein said specific subject area contains a specific subject in said photographed image;
a specific subject characteristic value calculation module that calculates a specific subject characteristic value, wherein said specific subject characteristic value represents a characteristic of image data corresponding to said determined specific subject area;
a correction value calculation module that calculates a correction value for color balance correction using said calculated specific subject characteristic value and a preset characteristic target value, wherein said calculated correction value includes a correction value weighted according to an area ratio of said specific subject area to a whole area of said photographed image; and
a correction execution module that executes said color balance correction on said image data using said calculated correction value.

10. An image processing device for executing color balance correction on image data of a photographed image, said image processing device comprising:
an image data acquisition module that acquires said image data:
a specific subject area determination module that determines a specific subject area in said photographed image, wherein said specific subject area contains a specific subject in said photographed image, and wherein said specific subject area determination module determines said specific subject area using pixel values of pixel data included in a target area for determination, and a position of said target area in said photographed image;
a specific subject characteristic value calculation module that calculates a specific subject characteristic value, wherein said specific subject characteristic value represents a characteristic of image data corresponding to said determined specific subject area;
a correction value calculation module that calculates a correction value for color balance correction using said calculated specific subject characteristic value and a preset characteristic target value; and
a correction execution module that executes said color balance correction on said image data using said calculated correction value.

11. An image processing method for executing color balance correction on image data of a photographed image, said image processing method comprising:
acquiring said image data;
determining a specific subject area in said photographed image, wherein said specific subject area contains a specific subject in said photographed image;
calculating a specific subject characteristic value, wherein said specific subject characteristic value represents a characteristic of image data corresponding to said determined specific subject area, wherein said calculating said specific subject characteristic value is executed using weighted distribution, and wherein said weighted distribution is set so as to be a weight in a center area of said specific subject area larger than a weight in an area outside said center area;

calculating a correction value for color balance correction using said calculated specific subject characteristic value and a preset characteristic target value; and executing said color balance correction on said image data using said calculated correction value.

12. An image processing method for executing color balance correction on image data of a photographed image, said image processing method comprising:

acquiring said image data;

determining a specific subject area in said photographed image, wherein said specific subject area contains a specific subject in said photographed image;

calculating a specific subject characteristic value, wherein said specific subject characteristic value represents a characteristic of image data corresponding to said determined specific subject area;

calculating a correction value for color balance correction using said calculated specific subject characteristic value and a preset characteristic target value; and executing said color balance correction on said image data using said calculated correction value, wherein when a plurality of said specific subject areas are determined, said calculating said specific subject characteristic value is executed using weighted distribution, wherein said weighted distribution is set according to a size of each specific subject area on each specific subject characteristic value of said plurality of specific subject areas.

13. An image processing method according to claim 12, wherein said specific subject characteristic value includes a specific color characteristic value for representing a characteristic of pixel data included within said specific subject area, said pixel data belonging to a specific color range.

14. An image processing method according to claim 13, wherein said specific color characteristic value includes a statistical value of pixel values of said pixel data belonging to said specific color range, wherein said characteristic target value includes a preset pixel target value, and wherein said calculated correction value includes a correction value for eliminating or reducing a difference between said statistical value of pixel values and said pixel target value.

15. An image processing method according to claim 13, wherein said specific subject includes a face part of a human subject, and wherein said pixel data belonging to said specific color range includes flesh colored pixel data belonging to a color range corresponding to a flesh color of said human subject.

16. An image processing method according to claim 12, wherein said executing said color balance correction on said image data using said calculated correction value is carried out when an area ratio of said specific subject area to a whole area of said photographed image is greater than a reference value.

17. An image processing method for executing color balance correction on image data of a photographed image, said image processing method comprising:

acquiring said image data;

determining a specific subject area in said photographed image, wherein said specific subject area contains a specific subject in said photographed image;

calculating a specific subject characteristic value, wherein said specific subject characteristic value represents a characteristic of image data corresponding to said determined specific subject area;

calculating a correction value for color balance correction using said calculated specific subject characteristic value and a preset characteristic target value, wherein said calculated correction value includes a correction value weighted according to an area ratio of said specific subject area to a whole area of said photographed image; and executing said color balance correction on said image data using said calculated correction value.

18. A computer program product for executing color balance correction on image data of a photographed image, said computer program product comprising:

a computer readable medium; and a computer program stored on said computer readable medium, said computer program comprising:

a program instruction for acquiring said image data;

a program instruction for determining a specific subject area in said photographed image, wherein said specific subject area contains a specific subject in said photographed image;

a program instruction for calculating a specific subject characteristic value, wherein said specific subject characteristic value represents a characteristic of image data corresponding to said determined specific subject area;

a program instruction for calculating a correction value for color balance correction using said calculated specific subject characteristic value and a preset characteristic target value; and a program instruction for executing said color balance correction on said image data using said calculated correction value, wherein when a plurality of said specific subject areas are determined, said specific subject characteristic value calculation is executed using weighted distribution, wherein said weighted distribution is set according to a size of each specific subject area on each specific subject characteristic value of said plurality of specific subject areas.

* * * * *